July 9, 1957  J. H. PENNEY  2,798,974
DYNAMOELECTRIC MACHINE

Filed March 17, 1954  2 Sheets-Sheet 1

WITNESSES:
E. A. McCloskey
Kw. L. Groome

INVENTOR
James H. Penney.
BY
ATTORNEY

July 9, 1957  J. H. PENNEY  2,798,974
DYNAMOELECTRIC MACHINE
Filed March 17, 1954  2 Sheets-Sheet 2

United States Patent Office 2,798,974
Patented July 9, 1957

2,798,974

DYNAMOELECTRIC MACHINE

James H. Penney, East Amherst, N. Y., assignor to Westinghouse Electric Corporation, East Pittsburgh, Pa., a corporation of Pennsylvania Application March 17, 1954, Serial No. 416,749

5 Claims. (Cl. 310—60)

The present invention relates to the construction of dynamoelectric machines, and more particularly to an air shield or baffle for directing ventilating air in such machines.

Dynamoelectric machines are usually provided with an internal fan, mounted on or integral with the rotor, for circulating ventilating air through the machine. It is usually also desirable to provide an air shield or baffle adjacent the fan to direct the air to the fan and over the windings of the machine in a desired path, so as to obtain the maximum cooling effect. In order to be fully effective, the air shield must be mounted in the proper position relative to the fan to direct substantially all of the air in the desired path, and to keep turbulence and recirculation of heated air to a minimum.

In the design and manufacture of electric motors and generators, certain standard frame sizes are used, and it is necessary to build motors of different electrical performance and horsepower ratings in frames of the same physical dimensions. This usually involves the use of stator cores and rotor members of different axial lengths, and when an air shield is mounted on the end bracket or frame of the machine, its axial position with respect to the frame must be different for rotors of different lengths, in order to be in the correct position with respect to the fan which is carried on the rotor. This has made it necessary, heretofore, to provide a number of different designs of air shields for use in the same motor frame with different rotor members. This practice involves undesirable expense, however, since it makes it necessary to produce and stock a number of different designs of air shields for each standard frame size.

The principal object of the present invention is to provide a dynamoelectric machine having an air shield mounted on the stator member and constructed in such a manner that it can be positioned in any one of a plurality of different positions axially of the machine for use with different rotor members.

Another object of the invention is to provide a dynamoelectric machine having an air shield mounted on the stator member and having a plurality of mounting means positioned in different planes, so that the air shield can be mounted in different axial positions with respect to the stator of the mcahine.

A further object of the invention is to provide an air shield for dynamoelectric machines arranged so that it can be mounted in different axial positions on the stator of a machine for use with rotors of different lengths.

Other objects and advantages of the invention will be apparent from the following detailed description, taken in connection with the accompanying drawing, in which.

Figure 1:
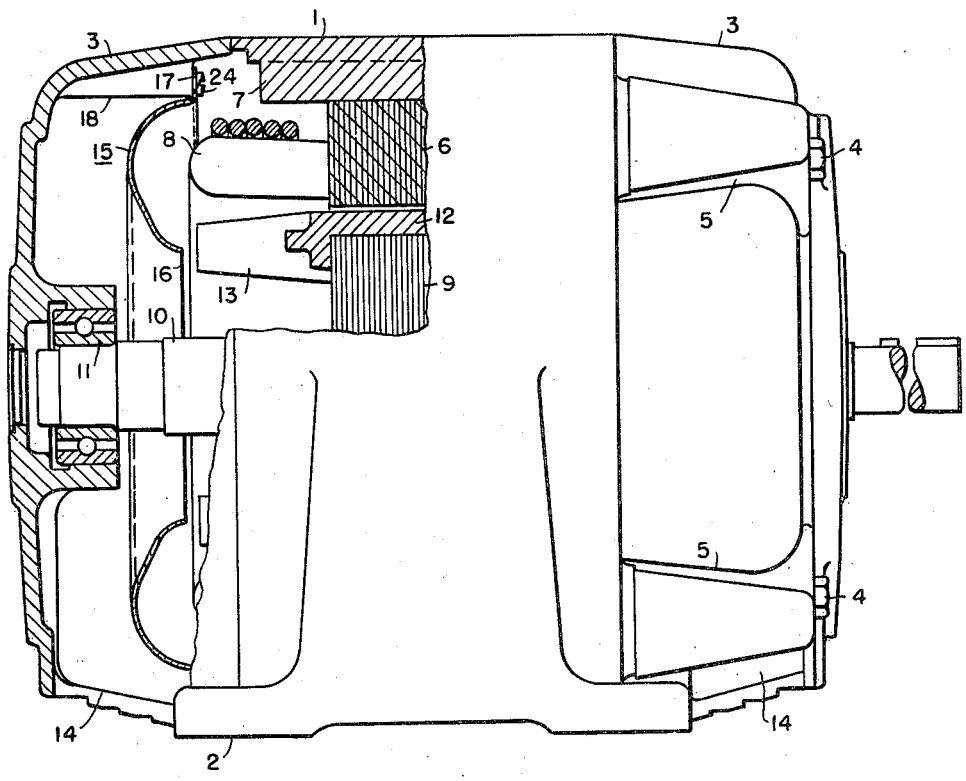
Fig. 1 is a view of a dynamoelectric machine embodying the invention, partly in elevation and partly in longitudinal section.

The invention is applicable to dynamoelectric machines of any size or type, and is shown in the drawing, for the purpose of illustration, embodied in an alternating current induction motor. The motor is shown as having a generally cylindrical frame 1, which may be provided with feet 2, and which is closed at the ends by end brackets 3. The end brackets 3 may be of identical construction and are secured to the frame 1 by means of bolts 4 passing through mounting lugs 5 of any suitable type. A laminated stator core 6 is supported in the frame 1 and is shown as being pressed into the frame on longitudinal ribs 7 which provide axial spaces between them for the circulation of ventilating air. Primary windings 8 of any suitable type are carried by the stator core 6. The motor also has a rotor member including a laminated core 9 mounted on a shaft 10 which is supported by bearings 11 in the end brackets 3. A secondary winding 12, shown as a squirrel-cage winding, is carried on the rotor core 9 and fan blades 13 are cast integrally with the winding 12 for circulating ventilating air through the motor. It will be understood that a separate fan might be mounted on the shaft, if desired, in place of the integral fan blades 13.

The machine is ventilated by air entering and leaving through ventilating openings 14 in the brackets 3. An air shield or baffle 15 is mounted on the stator of the motor to direct the air in the desired manner. The air shield 15 may be of any desired type and is shown as being an annular sheet metal shield or baffle having a central opening 16 for directing the incoming air into the fan blades 13, and being formed as shown in the drawing to direct air discharged from the fan over the end turns of the winding 8 and into the axial pasages between the ribs 7. The air shield 15 also has a peripheral flange portion 17, and it is mounted on three bosses 18 on the inside of the end bracket 3 by means of the flange 17.

As previously explained, the air shield 15 must be positioned in the correct axial location with respect to the fan blades 13 and the stator windings 8, in order to be fully effective for its intended purpose. If rotors of different lengths are to be used in frame structures of the same dimensions, the axial position of the air shield relative to the frame must be changed accordingly, and this had required, heretofore, the provision of a number of different designs of air shields for use with a given frame size, in order to permit the air shield to be properly positioned for rotors of different lengths.

Figure 3:
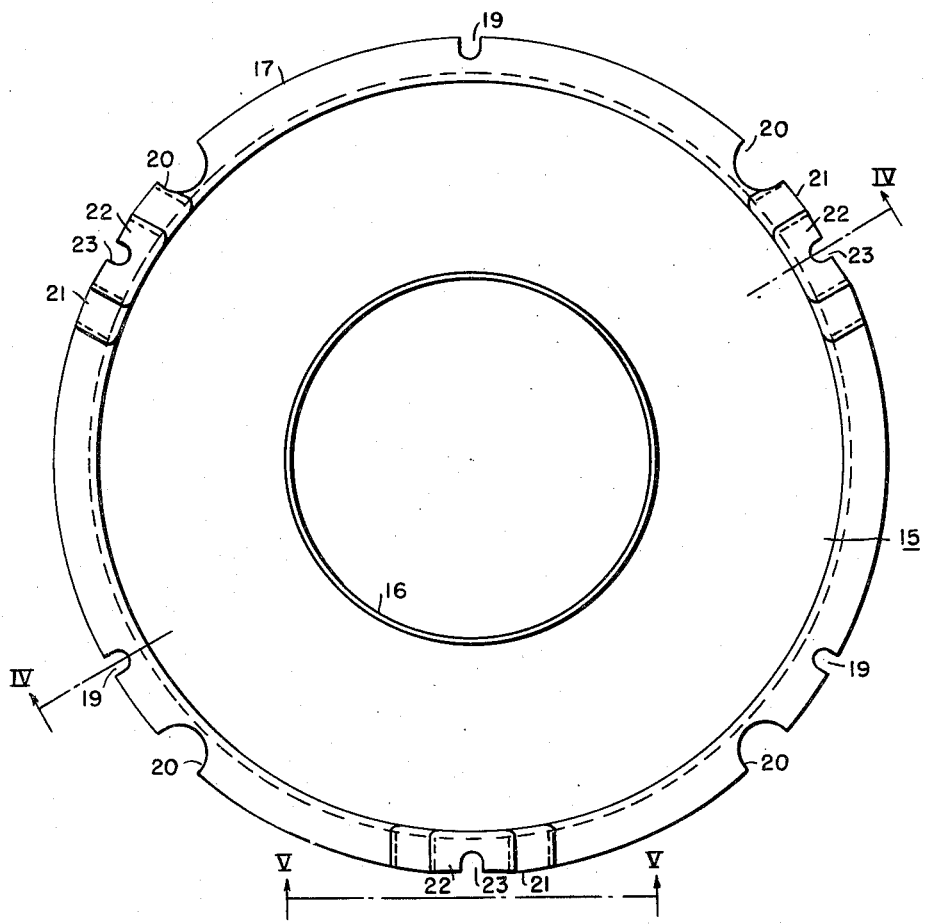
Fig. 3 is a view in elevation of the air shield.
Figure 4:
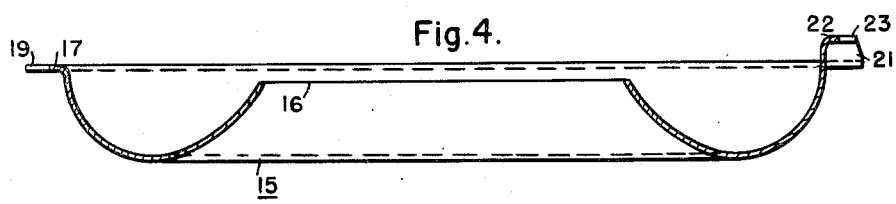
Fig. 4 is a transverse sectional view of the air shield, approximately on the line IV—IV of Fig. 3.
Figure 5:
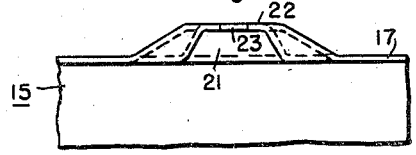
Fig. 5 is a fragmentary side view of the air shield, as indicated by the arrows V—V of Fig. 3.

In accordance with the present invention, the air shield 15 is so designed that it can be mounted in a plurality of different axial positions for use with different rotors, thus eliminating the necessity for several different designs of air shields. As shown in Figs. 3, 4 and 5, the air shield has three mounting holes or notches 19 equally spaced apart in the flange portion 17. The mounting holes 19 are positioned to cooperate with the bosses 18 of the end brackets 3 to mount the air shield in the motor. If necessary, larger notches 20 may be formed at the appropriate points in the flange 17 to clear the mounting bolts 4 which extend through the bracket 3 into the frame 1. Three depressions 21 are also formed in the flange 17 equally spaced apart and equally spaced from the mounting holes 19. The depressions 21 may be of any desired shape and depth and are made wide enough to receive the bosses 18 of the bracket 3. In the illustrated embodiment, the depressions 21 extend from the plane of the flange 17 on the side opposite the body of the air shield and have flat outer surfaces 22 which all lie in the same plane. A second set of mounting holes 23 is formed in the flat surfaces 22 of the depressions.

Figure 2:
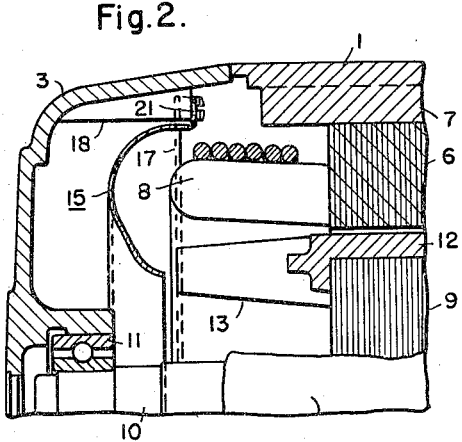
Fig. 2 is a fragmentary sectional view similar to Fig. 1, but showing the air shield mounted in an alternative position.

In Fig. 1, the air shield 15 is shown mounted on the bracket 3 by means of screws 24 threaded into the bosses 18 and engaging the mounting holes 19, positioning the air shield in the desired position with respect to the fan blades 13 of the rotor. If a rotor of greater length, or having longer fan blades, is to be used, however, the proper position of the air shield 15 is correspondingly shifted to the left, as viewed in Fig. 1. If the air shield is to be placed in this position, it is rotated 180° from the position shown in Figs. 1 and 3, so that the depressions 21 coincide with the bosses 18, and the air shield is mounted on the bosses by means of the mounting holes 23, as shown in Fig. 2. It is evident, that when so mounted, the axial position of the air shield with respect to the stator of the machine is displaced to the left so that a longer rotor can be used.

It should now be apparent that an air shield for dynamoelectric machines has been provided which is capable of being mounted in a machine in different axial positions, so that the same air shield can be used with rotors of different lengths. In this way the necessity of providing a number of different designs for use with frame structures of the same dimensions is avoided, and a single design of air shield can be used with different rotors, resulting in a considerable saving in cost. In the particular embodiment of the invention shown and described, the air shield can be positioned in either of two axial positions. It will be obvious, however, that it could be designed to have any desired number of additional locations. Thus, additional sets of mounting holes could be provided in the flange 17 positioned in depressions of greater or less depth than the depressions 21, or in depressions extending in the opposite direction from the flange 17. Thus the air shield 15 can readily be designed for mounting in any desired number of different axial positions.

A particular embodiment of the invention has been shown and described for the purpose of illustration, but it will be apparent that various modifications and other embodiments are possible within the scope of the invention, and it is to be understood that the invention is not limited to the specific type of machine or details of construction shown, but is adaptable to any type of dynamoelectric machine, and includes all equivalent embodiments and modifications.

I claim as my invention:

1. A dynamoelectric machine having a stator member and a rotor member, fan means on the rotor member for circulating ventilating air, and an air shield on the stator member for directing said air, said air shield having a plurality of mounting means thereon adapted for alternative use to position the air shield on the stator member in any one of a plurality of fixed positions axially of the machine.

2. A dynamoelectric machine having a stator member and a rotor member, fan means on the rotor member for circulating ventilating air, and an air shield on the stator member for directing said air, said air shield having a peripheral flange portion, and the flange portion having a plurality of sets of mounting holes therein disposed in different planes for mounting the air shield on the stator member in any one of a plurality of fixed positions axially of the machine.

3. A dynamoelectric machine having a stator member and a rotor member, fan means on the rotor member for circulating ventilating air, and an air shield on the stator member for directing said air, said air shield having a peripheral flange portion, a first set of mounting holes in said flange portion for mounting the air shield on the stator member, a plurality of spaced depressions in the flange portion, and a second set of mounting holes in said depressions.

4. A dynamoelectric machine having a stator member and a rotor member, fan means on the rotor member for circulating ventilating air, said stator member including a frame member and end brackets at each end of the frame member, at least one of said brackets having a plurality of bosses thereon, and an air shield mounted on said bosses, said air shield having a plurality of sets of mounting means disposed in different planes for mounting the air shield on the bosses in different positions axially of the machine.

5. A dynamoelectric machine having a stator member and a rotor member, fan means on the rotor member for circulating ventilating air, said stator member including a frame member and end brackets at each end of the frame member, at least one of said brackets having a plurality of bosses thereon, and an air shield mounted on said bosses, said air shield having a peripheral flange portion, a first set of mounting holes in the flange portion for mounting the air shield on the bosses, a plurality of spaced depressions in the flange portion, and a second set of mounting holes in said depressions for mounting the air shield on the bosses in a different position axially of the machine.

References Cited in the file of this patent

UNITED STATES PATENTS

| | | |
|---|---|---|
| 1,834,959 | May | Dec. 8, 1931 |
| 2,394,414 | Wightman | Feb. 5, 1946 |

FOREIGN PATENTS

| | | |
|---|---|---|
| 341,164 | Great Britain | Jan. 15, 1931 |